Patented Nov. 8, 1932

1,887,190

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, A BRITISH COMPANY

MANUFACTURE OF GOODS FROM AQUEOUS DISPERSIONS OF OR CONTAINING RUBBER AND SIMILAR RESINS

No Drawing. Application filed September 29, 1928, Serial No. 309,353, and in Great Britain October 5, 1927.

This invention comprises improvements in or relating to the manufacture of goods of rubber or similar material by known operations such as dipping, spreading, coating, moulding, extrusion, chemical deposition or electrophoretic deposition from emulsions or dispersions of rubber or similar materials.

The products so obtained represent in most cases a penultimate stage and are in a more or less pasty condition containing a relatively large proportion of water, e. g. from 10% to even 100% or more (calculated on the solid constituents). In such condition the products are for the most part lacking in mechanical strength and easily lose their shape, so that extremely careful handling is necessary during any subsequent process, for instance of drying and/or vulcanizing.

It is the object of this invention so to treat such products that, in addition to other advantages, the periods normally required for removal of the water are materially lessened.

According to this invention products obtained by any of the aforesaid or similar operations from emulsions or liquid dispersions hereinafter to be described are, while still in a pasty or creamy stage, brought into contact with or subjected to the action of a liquid medium which serves partially or wholly to dehydrate and to set the same, thereby rendering further handling treatments, such as repeated dipping or drying and/or vulcanization, much easier and quicker to perform.

The emulsions or dispersions comprise by way of example those consisting of or containing rubber, gutta percha, balata or similar vegetable resins occurring naturally or artificially obtained and in vulcanized or unvulcanized condition. Dispersions of coagulated rubber, vulcanized rubber, waste or reclaim may also be employed, if desired, as admixtures. Any of the aforesaid dispersions may contain the usual known compounding agents and/or may be in concentrated form. Concentrates such as are described in our Patent 1,846,164 are particularly suitable for use.

As the liquid medium a solution containing a salt or mixture of salts, with or without an acid such as acetic acid or mixture of acids, may be employed. Preferably salts, not normally coagulants in the generally accepted sense with regard to latex, are used; the alkali metal and ammonium salts, such as sodium chloride, ammonium chloride or ammonium acetate being very suitable. Other salts, such as calcium chloride, alums, magnesium sulphate, can, however also be used. Baths containing fused crystalline substances, such as sodium acetate, sodium thiosulphate, acetamide, ammonium acetate or ammonium formate which melt below about 100° C. can also be employed without addition of water.

The products in a wet or moist condition are immersed in the liquid medium, say a dissolved salt. The time of immersion depends on various factors, such as the temperature, the nature of the product, the thickness of the same and the nature of the salt used, but generally ranges from even less than one minute for thin articles up to ten minutes or more. The solutions are preferably heated for example from 70° C. to 90° C. and of fairly high concentration or even near saturation. Lower temperatures generally involve a decrease in the speed of the effect.

Under certain conditions it may be advantageous to reduce the fluidity of the liquid medium in order to facilitate its application. For this purpose it may be mixed with a viscid liquid such as a solution of glue or agar or glycerine and/or with some insoluble or sparingly soluble substance such as clay, kaolin, kieselguhr, calcium sulphate, whiting, etc.

The process is especially suitable when more than one layer of the coating material is to be applied. Thus a product may be dipped into the liquid medium, washed with water if necessary, and then provided with another coating and so on.

The following examples are given by way of illustration as to how the process can be effected:—

(1) A deposit 0.5 mm. thick produced by immersing a mould in concentrated compounded latex containing 30% of water was dipped into a solution of ammonium acetate of 50% concentration at 90° C. After a period of two minutes in this solution the deposit, which previously was of creamy consistency, had become solid and its water content had been reduced by three fifths. The treated deposit could at once be stripped from its support in an elastic coherent condition and was ready for subsequent treatment.

(2) A deposit 0.6 mm. thick produced on a tubular mandrel or former was immersed for three minutes as described in Example 1 but using a hot concentrated solution of ammonium sulphate. It was then rinsed in hot water and a further deposit of approximately the same thickness as the earlier one immediately superposed. The treatment with hot salt solution was then repeated for five minutes and then the deposit was ready for subsequent treatment.

(3) A pasty deposit capable of giving a tube with a wall 1⅕ mm. thick when dry, obtained by electrophoretic deposition on a tubular zinc anodic former, contained approximately 50% of water. By immersion for five minutes in saturated brine at 90° C. the water content was reduced and the tube could be at once removed from the zinc former.

(4) A core of concentrated compounded latex forced upwards 1 mm. in diameter from a die into a saturated bath of sodium acetate at 90° C. gave a thread which after remaining one minute in the solution could be removed, dried and vulcanized.

(5) A concentrated compounded latex mixing was made up of the following constituents:

| | Per cent |
|---|---|
| Rubber, introduced as latex | 90.8 |
| Sulphur | 2.0 |
| Paraffin wax | 1.0 |
| Transformer oil | 1.0 |
| Zinc diethyldithiocarbamate | 0.2 |
| Zinc oxide | 5.0 | so as to have approximately 60% rubber and other ingredients to 40% water.

This creamy mixture is extruded through an orifice or die and immediately set by contact with a dehydrating bath containing, for example, as dehydrating and setting liquid, a solution of 150 parts of common salt and 150 parts of ammonium acetate in 450 parts of water, the temperature of the bath being maintained between about 80° C. and 85° C. in the following manner:—

The creamy mixture is placed in a container so that it can flow under a head of a few inches to a jet situated in the bath. The jet itself may consist of a slightly tapering nozzle, e. g. in length, made of suitable material such as glass, steatite, nickel or stainless steel. In the preferred arrangement the jet is disposed with its orifice facing vertically upwards at a distance below the surface of the solution. If the free surface of the latex in the container is more than a few inches above the orifice of the jet the effective hydrostatic pressure is reduced by maintaining a suitable degree of pressure below atmospheric pressure in the atmosphere of the container.

The buoyancy of the medium in the bath causes the creamy mixture to rise in a vertical column and during its short passage to the surface the column of creamy mixture becomes sufficiently set to suffer no permanent deformation when on reaching the surface its direction of movement undergoes alteration.

It is advisable for the feed pipe to the jet and the jet itself to be water-cooled in order to avoid marked changes in viscosity arising from thermal influences.

It has been found, for example, using the same reservoir and the same quantity of latex cream, that where a jet with an orifice of one millimetre in diameter and six centimetres below the liquid level of the bath yielded a thread 0.84 millimetres in diameter, at a distance of 8 centimetres below the level, the thread decreased to 0.65 millimetres, the height of the level of the latex cream above the top of the jet being 20 centimetres, and that a jet of the preceding cross sectional dimension placed at a distance of 6 centimetres below the level of the setting liquid yielded thread at the rate of 10 ft. per minute.

The setting bath is desirably made of sufficient length to permit the thread to travel in the setting and dehydrating liquid for about 15 seconds whence it is then transferred as, for example, by a suitable system of pulleys, into a tank of hot water at a temperature of 90° C. to 95° C. In an actual case, thread produced from concentrated compounded latex containing 42.1% of water after 10 seconds immersion in the dehydrating and setting liquid and a subsequent 12 seconds washing in hot water, showed a content of only 23.7% of water. At the surface of contact between the formed or extruded rubber composition and the dehydrated bath or liquid water is absorbed directly into the dehydrating liquid from the surface of the formed or extruded rubber composition, thus setting the outer surface of contact. Water from the underlying layer is then drawn to the surface of contact and into the dehydrating liquid by osmotic or analogous action until the entire mass of the formed rubber composition is set by the abstraction of all or a sufficient part of its water content. This dehydrating and water abstracting action preferably takes place without any coagulating or curdling action. Salts that are not coagulating agents may be used. Other salts which in dilute solution are known as coagulants of rubber latex, such as aluminum chloride, alums or magnesium sulphate may also be used provided that they are in sufficient concentration so that a penetrative osmotic drying action predominates over any coagulative action.

It is necessary to adjust the surface speed of any pulleys in such a way that it corresponds with the rate of delivery near the jet. If the speed is too great the thread may be pulled from the vertical position during its ascent to the surface of the dehydrating and setting liquid, in which case a misshapen cross section may be obtained; if too low, undesirable coiling of the thread may occur in the dehydrating bath. The time in the hot water tank may be varied as, for example, from a few seconds to a minute or more, e. g. according to the amount of serum solids it is desired to remove from the thread. Vulcanization may be effected either by passing the thread continuously through a heated chamber or by loosely coiling lengths of the material and vulcanizing on trays in any convenient manner. Drying may occur concurrently with the vulcanization or independently as desired. At some stage between the dehydrating and setting bath and the final drying and/or vulcanization operation it is often advantageous to apply a surface lubricant such as French chalk to the thread in order to ensure the reduction of surface friction to a minimum in any manufacturing operations to which the thread may later be applied.

(6) Compounded and concentrated latex extruded through a die of annular cross-section into a bath of saturated ammonium acetate at 90° C. yielded a tube which, after remaining a short time in the solution, could be removed, dried and vulcanized.

One explanation of the results produced by the baths may be that "dehydration and setting" effects occur concurrently and are similar to the action of salts such as magnesium sulphate or agar-agar emulsions as observed by Kruyt (Colloids, p. 185), but whatever be the actual cause the fact remains that whereas an electrophoretically formed tube 3 mm. thick in the wall, which had not been treated according to this invention, took about five hours drying before it could be removed from its former or mandrel, a similar tube treated by the process could be stripped in about a quarter of an hour.

The process offers other advantages. Thus the consistency and strength of a treated rubber deposit are also greatly improved and any undesirable tendency of the material to flow under gravitational force is suspended. The regular shrinkage accompanying the dehydration takes place without rupture of the surface of the deposit or paste and prevents the development of cracks which are sometimes observable in the slow drying of such wet material in the ordinary way; the shrinkage also aids the transference of a sharp impression of any pattern from the surface of the mould or former to the adjacent surface of the rubber deposit. Deposits after such treatment of dehydrating and setting even without further drying, can at once be handled or stripped from their support, thereby enabling more convenient and expeditious treatment in the subsequent and final stages and more rapid return of the supporting former to the production of new deposits.

What we claim is:—

1. The method of forming continuous lengths of rubber which comprises extruding an aqueous rubber dispersion directly into a dehydrating fluid comprising a fused salt.

2. A method of forming articles of rubber which comprises shaping a dispersion of rubber material to a desired form without substantial or complete dehydration, and dehydrating said shaped dispersion by penetrative osmotic action.

3. A method of forming rubber articles which comprises shaping a dispersion of rubber material to a desired form without coagulation sufficient to form an impermeable surface film, and withdrawing water from said material through the surface of said formed dispersion by osmotic dehydration.

4. A method of forming rubber articles which comprises shaping a dispersion of rubber material to a desired form without coagulation sufficient to form an impermeable surface film, and withdrawing water through the surface of said formed dispersion by osmotically absorbing water from said dispersion to salts in contact with the surface thereof.

5. A method of forming rubber articles which comprises shaping a dispersion of rubber material to a desired form without coagulation sufficient to form an impermeable surface film, and withdrawing water through the surface of said formed dispersion by osmotically absorbing water from said dispersion to fused salts in contact with the surface thereof.

6. A method of forming rubber articles which comprises shaping a dispersion of rubber material to a desired form without coagulation of said dispersion to an impermeable surface film, and withdrawing water by osmosis into a medium comprising salts at the surface of said formed dispersion.

7. A method of forming an elongated rubber article which comprises extruding an aqueous dispersion of rubber material, and absorbing water by osmosis from said extruded dispersion without substantial coagulation directly as it is extruded.

8. A method of forming elongated rubber articles which comprises extruding an aqueous dispersion of rubber material directly into a dehydrating medium having insufficient coagulative effect to form an impermeable film on said extruded dispersion.

9. A method of forming elongated rubber articles which comprises extruding an aqueous dispersion of rubber material into a dehydrating medium comprising salts of a valency less than three and having no substantial coagulating effect.

10. A method of forming elongated rubber articles which comprises extruding an aqueous dispersion of rubber material, and withdrawing water from said dispersion immediately upon extrusion and without forming a surface film of coagulated rubber non-permeable to the dispersing medium of said dispersion.

11. The method of claim 2 in which the dehydration is accomplished by contact with a concentrated salt solution.

12. The method of claim 2 in which the dehydration is accomplished by contact with a concentrated salt solution in the presence of a small amount of acid coagulant.

In witness whereof, we have hereunto signed our names.

DOUGLAS FRANK TWISS.
EDWARD ARTHUR MURPHY.